United States Patent [19]
Murphy

[11] Patent Number: 6,036,285
[45] Date of Patent: Mar. 14, 2000

[54] BRAKE SYSTEM USING TORQUE FEEDBACK CONTROL WITH TORQUE LEVEL TRANSITIONING

[75] Inventor: John T. Murphy, Middlebury, Vt.

[73] Assignee: The B.F. Goodrich Company, Akron, Ohio

[21] Appl. No.: 09/001,572

[22] Filed: Dec. 31, 1997

[51] Int. Cl.[7] ........................................................... B60T 8/00
[52] U.S. Cl. ........................ 303/112; 303/126; 188/181 T
[58] Field of Search .................... 303/112, 126, 303/155; 701/78, 71, 75; 188/181 T, 181 A, 181 C

[56] References Cited

U.S. PATENT DOCUMENTS

| | | |
|---|---|---|
| 3,586,387 | 6/1971 | Riordan . |
| 3,614,172 | 10/1971 | Riordan . |
| 4,336,592 | 6/1982 | Beck ........................................ 303/112 |
| 4,412,291 | 10/1983 | Amberg et al. ........................ 303/112 |
| 4,603,763 | 8/1986 | Mikina ................................ 188/250 F |
| 4,679,866 | 7/1987 | van Zanten et al. . |
| 4,715,662 | 12/1987 | van Zanten et al. . |
| 4,764,871 | 8/1988 | van Zanten . |
| 4,822,113 | 4/1989 | Amberg et al. ........................ 303/112 |
| 5,050,940 | 9/1991 | Bedford et al. ..................... 188/181 C |
| 5,180,214 | 1/1993 | Yeh et al. . |
| 5,371,677 | 12/1994 | Ehret et al. . |
| 5,424,942 | 6/1995 | Dong et al. . |
| 5,454,630 | 10/1995 | Zhang . |
| 5,487,594 | 1/1996 | Schneider ............................... 303/155 |
| 5,505,531 | 4/1996 | Griffith et al. .......................... 303/126 |
| 5,918,951 | 7/1999 | Rudd, III ............................. 188/188 T |

FOREIGN PATENT DOCUMENTS 28 29 207  7/1978  Germany .

OTHER PUBLICATIONS

Mark L. Akey, "Fuzzy Logic, Anti–Skid Control for Commercial Trucks"; Magnavox Decision Support Systems Applied Center of Excellence, Fort Wayne, Indiana, SPIE vol. 2493, Mar. 1995, pp. 359–370.

Hutchinson, et al., "Applications of Minimum Variance Reduced–State Estimators", IEEE Transactions on Aerospace and Electronic Systems; Sep. 1975; pp. 785–794.

du Plessis, "Poor Man's Explanation of Kalman Filtering" Autonetics Division, Rockwell International; date unknown.

Kobayashi, et al., Estimation of Absolute Vehicle Speed Using Fuzzy Logic Rule–Based Kalman Filter Proceedings of the American Control Conference; Jun. 1995.

*Primary Examiner*—Mark T. Le
*Assistant Examiner*—Thomas J. Williams
*Attorney, Agent, or Firm*—Renner, Otto, Boisselle & Sklar

[57] ABSTRACT

A brake system and torque feedback controller is provided which utilizes low torque cutout rather than low speed cutout. The low torque cutout is further improved by gradually transitioning between torque feedback and open loop control over a range of torque. The controller allows torque compensation operation to zero wheel speed, and avoids discontinuities in braking regardless of time or torque level. The controller allows a brake to fill and engage the wheel before the full feedback signal is presented to the controller so as to eliminate the phenomena of grabby brakes.

29 Claims, 6 Drawing Sheets

BRAKE SYSTEM USING TORQUE FEEDBACK CONTROL WITH TORQUE LEVEL TRANSITIONING

TECHNICAL FIELD

The present invention relates generally to brake systems for vehicles, and more particularly to a brake control system based on torque feedback control.

BACKGROUND OF THE INVENTION

Brake systems for vehicles (e.g., aircraft, automobiles, etc.) are well known in the art. Most brake systems include a brake actuator for exerting pressure on brake material. The brake material in turn exerts a braking torque on the element to be braked (e.g., the wheel of the vehicle). The brake actuator may be hydraulic or electromechanical, for example. By selectively activating the brake actuator, a desired amount of braking torque, or force, may be applied to the element to be braked.

In the past, torque feedback has been considered desirable in braking applications to compensate for various effects. For example, brake systems for vehicles have included a controller which utilizes the measured braking torque applied to the wheel to compensate for brake fade (due to thermal effects) and grabby brakes (common with carbon brakes). A torque sensor would measure the torque applied to the wheel and the output of the torque sensor was fed back to the controller.

Various problems arose, however, as a result of the use of torque feedback. For example, due to sensor noise and physical properties of torque, the output of the torque sensor was not valid at or near zero wheel speed. To account for this, the torque feedback was disabled below a predefined wheel speed and the brake system would revert to open loop control. This "low speed cutout" of the torque feedback control would naturally have to occur at a speed at which the output of the wheel speed sensor was still valid. Since wheel speed sensors typically are valid only to a predefined lower speed limit, the low speed cutout was required to occur at a speed greater than the lower speed limit. Thus, the limitations of the torque sensor and the wheel speed sensor precluded torque compensation at low wheel speeds.

Another problem with torque feedback using low speed cutout control is that the transition from closed loop control to open loop control has to occur over a period of time. If the pilot of an aircraft or driver of an automobile happens to be activating the brake during this time, a gradual change may be felt. If the pilot or driver does not happen to be operating the brake during the transition period, however, a sudden change may be perceived in the next brake application. This sudden change would present a discontinuity in the braking felt by the pilot/driver and even passengers, creating feelings of discomfort and/or alarm.

Furthermore, problems occur when proportional-integral (P-I) controllers are used in combination with the low speed cutout. If braking is applied at high speed, the integral portion of the P-I controller will tend to overshoot and cause the brake to grab initially. This can cause a short wheel skid if the surface on which the wheel is running is not dry.

In view of the aforementioned shortcomings associated with brake systems employing torque feedback control, there is a strong need in the art for a brake system which provides more suitable torque compensation. There is a strong need in the art for a system in which allows torque compensation operation to substantially zero wheel speed. Moreover, there is a strong need for a system in which torque compensation is provided with substantially no discontinuities, regardless of time or torque level. In addition, there is a strong need for a system in which the brakes do not tend to grab as a result of brake material or the integral portion of a P-I controller.

SUMMARY OF THE INVENTION

A brake system and torque feedback controller is provided which utilizes low torque cutout rather than low speed cutout. The low torque cutout is further improved by gradually transitioning between torque feedback and open loop control over a range of torque. The controller of the present invention allows torque compensation operation to zero wheel speed, and avoids discontinuities in braking regardless of time or torque level. The controller allows a brake to fill and engage the wheel before the full feedback signal is presented to the controller so as to eliminate the phenomena of grabby brakes.

According to one aspect of the invention, a system is provided for controlling a braking torque applied to a wheel of a vehicle. The system includes a torque level transitioning controller having an input for receiving a brake torque command indicative of a desired amount of brake torque to be applied to the wheel, and an output for providing a brake torque output command to a brake actuator and assembly which applies a brake torque to the wheel based on the brake torque output command; a torque sensor, operatively coupled to the brake actuator and assembly and the torque level transitioning controller, for measuring an amount of brake torque applied to the wheel and feeding back a signal to the torque level transitioning controller indicative of the amount of applied brake torque; and wherein the torque level transitioning controller adjusts the brake torque output command provided to the brake actuator and assembly using torque feedback control based on the signal fed back from the torque sensor, and the torque level transitioning controller is configured to limit a degree of the torque feedback control based on the measured amount of brake torque applied to the wheel.

In accordance with another aspect of the invention, a system is provided for controlling a braking torque applied to a wheel of a vehicle. The system includes a torque level transitioning controller having an input for receiving a brake torque command indicative of a desired amount of brake torque to be applied to the wheel, and an output for providing a brake torque output command to a brake actuator and assembly which applies a brake torque to the wheel based on the brake torque output command; a torque sensor, operatively coupled to the brake actuator and assembly and the torque level transitioning controller, for measuring an amount of brake torque applied to the wheel and feeding back a signal to the torque level transitioning controller indicative of the amount of applied brake torque; and wherein the torque level transitioning controller transitions between substantially open loop control of the brake torque output command independent of the measured brake torque and substantially closed loop feedback control of the brake torque output command based on the measured brake torque as a function of the measured brake torque.

According to still another aspect, the invention involves a method including the steps of receiving a brake torque command indicative of a desired amount of brake torque to be applied to the wheel, and providing a brake torque output command to a brake actuator and assembly which applies a brake torque to the wheel based on the brake torque output command; measuring an amount of brake torque applied to the wheel and using a signal indicative of the amount of applied brake torque to perform torque feedback control of the brake torque output command; and adjusting the brake torque output command provided to the brake actuator using the torque feedback control based on the signal fed back from the torque sensor, the adjusting step including a step of limiting a degree of the torque feedback control based on the amount of brake torque applied to the wheel.

According to still another aspect of the invention, a method is provided which includes the steps of receiving a brake torque command indicative of a desired amount of brake torque to be applied to the wheel, and providing a brake torque output command to a brake actuator and assembly which applies a brake torque to the wheel based on the brake torque output command; measuring an amount of brake torque applied to the wheel and using a signal indicative of the amount of applied brake torque to perform torque feedback control of the brake torque output command; and transitioning between substantially open loop control of the brake torque output command independent of the measured brake torque and substantially closed loop feedback control of the brake torque output command based on the measured brake torque as a function of the measured brake torque.

In accordance with another aspect of the invention, a torque level transitioning controller is provided for controlling a braking torque applied to a wheel of a vehicle via a brake actuator and assembly based on an output of a torque sensor which measures an amount of brake torque applied to the wheel, the output of the torque sensor being fed back to the torque level transitioning controller. The torque level transitioning controller includes an input for receiving a brake torque command indicative of a desired amount of brake torque to be applied to the wheel, and an output for providing a brake torque output command to the brake actuator and assembly which applies a brake torque to the wheel based on the brake torque output command and another input for receiving the output of the torque sensor, and circuitry for adjusting the brake torque output command provided to the brake actuator and assembly using torque feedback control based on the output received from the torque sensor, so as to limit a degree of the torque feedback control based on the measured amount of brake torque applied to the wheel.

In accordance with still another aspect of the invention, a torque level transitioning controller is provided for controlling a braking torque applied to a wheel of a vehicle via a brake actuator and assembly based on an output of a torque sensor which measures an amount of brake torque applied to the wheel, the output of the torque sensor being fed back to the torque level transitioning controller. The torque level transitioning controller includes an input for receiving a brake torque command indicative of a desired amount of brake torque to be applied to the wheel, and an output for providing a brake torque output command to the brake actuator and assembly which applies a brake torque to the wheel based on the brake torque output command and another input for receiving the output of the torque sensor, and circuitry which transitions between substantially open loop control of the brake torque output command independent of the measured brake torque and substantially closed loop feedback control of the brake torque output command based on the measured brake torque as a function of the measured brake torque.

According to still another aspect of the invention, a method for controlling a braking torque applied to a wheel of a vehicle is provided. The method includes the steps of receiving a brake torque command indicative of a desired amount of brake torque to be applied to the wheel, and providing a brake torque output command to a brake actuator and assembly which applies a brake torque to the wheel based on the brake torque output command; measuring a parameter which varies as a result of the amount of brake torque applied to the wheel and using a signal indicative of the measured parameter to perform feedback control of the brake torque output command; and adjusting the brake torque output command provided to the brake actuator using feedback control based on the measured parameter, the adjusting step including a step of limiting a degree of the feedback control based on a value of the measured parameter.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 4b is a plot showing the controller error versus measured torque corresponding to the plot shown in FIG. 4a;

DESCRIPTION OF THE PREFERRED EMBODIMENTS

Figure 1:
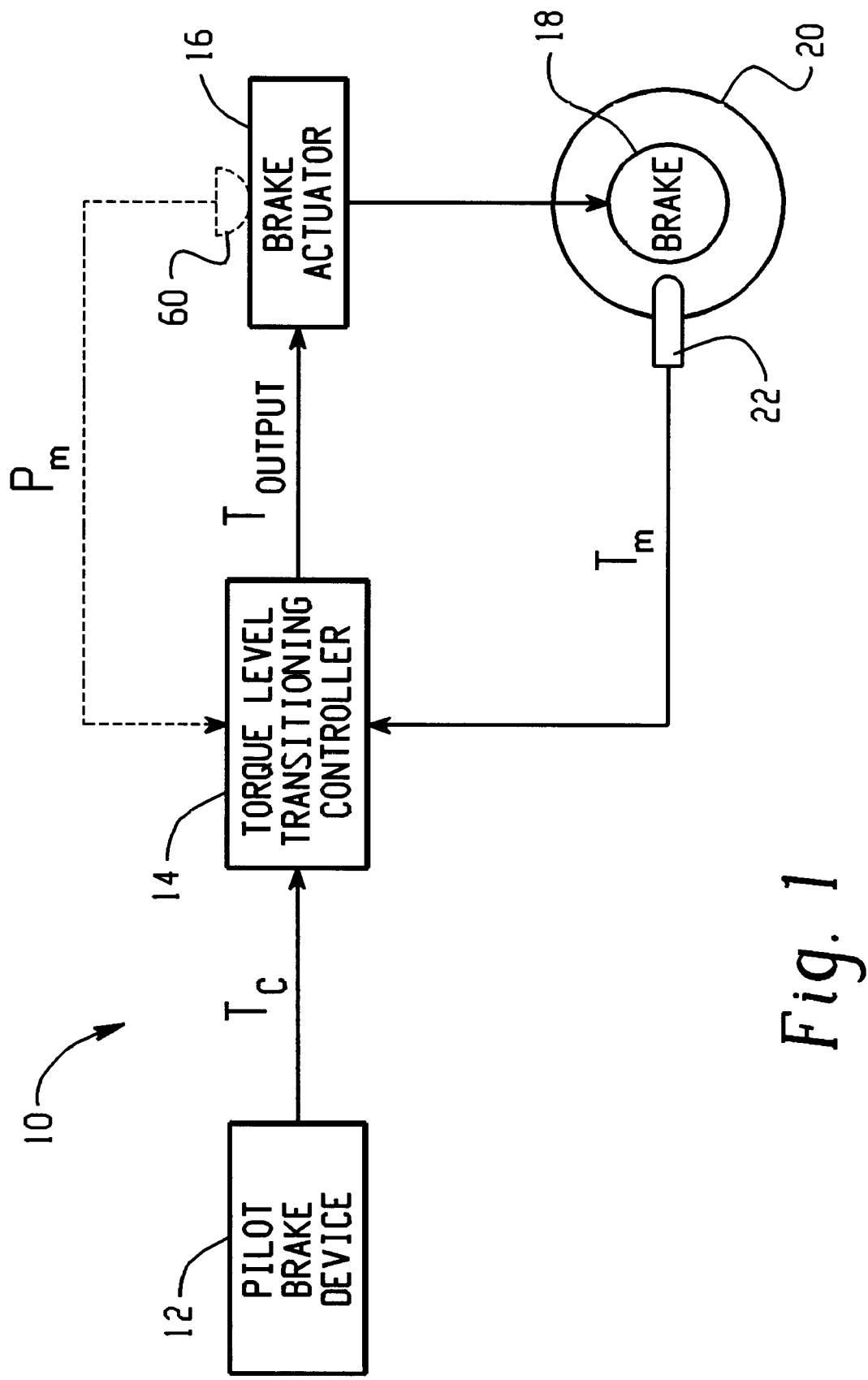
FIG. 1 is a block diagram of a brake system incorporating torque feedback control using torque level transitioning in accordance with the present invention.

The present invention will now be described with reference to the figures in which like reference numerals are used to refer to like elements throughout.

Referring initially to FIG. 1, a brake control system with torque compensation for an aircraft in accordance with the present invention is generally designated 10. Brake control on an aircraft is usually structured in a paired wheel configuration for functional modularity. For example, if the aircraft has two wheels on the left side of the aircraft and two wheels on the right side, the outer two wheels form a pair and the inner two wheels form another pair. Within a pair there is a right wheel control and left wheel control. The left and right wheel control functions are uncoupled except for locked wheel protection. The basic unit therefore consists of control of a single wheel which can be left or right. As utilized herein, it will be appreciated that the term "wheel" is intended to refer collectively to both the wheel and tire.

For sake of simplicity, the brake control system 10 as shown in FIG. 1 represents the basic unit for providing brake control of a single wheel (left or right). However, it will be appreciated that control for the other wheel(s) can be provided via corresponding systems 10 or in a single system incorporating the same inventive principles. Moreover, the preferred embodiment of the present invention provides brake control in connection with an aircraft. Nevertheless, it will be appreciated that the brake control system with torque compensation according to the present invention has utility for virtually any type of vehicle and is not limited necessarily to brake control for aircraft.

The system 10 includes a pilot brake device 12 for providing operator brake control. In addition, the system 10 includes a torque level transitioning controller 14. The controller 14 controls the amount of torque applied by the braking system 10 as is described more fully below. Specifically, the controller 14 provides a control signal to a brake actuator 16 included in the system 10. The brake actuator 16 may be any conventional type actuator (e.g., hydraulic, electromechanical, or pneumatic) for applying pressure to the brake material (not shown) in a brake assembly 18. The brake assembly 18 in turn provides braking action to a wheel 20 by exerting a braking torque on the wheel 20 as is conventional.

The system 10 further includes a brake torque sensor 22 which measures the amount of torque exerted by the brake actuator 16 and brake assembly 18 on the wheel 20. The measured torque is input to the controller 14. As will be discussed in detail below, the controller 14 uses torque compensation to control the amount of braking applied to the wheel 20. Unlike systems which utilize a low speed cutout approach to disable the torque compensation, the present invention is not reliant on wheel speed. Rather, the present invention utilizes what is referred to as "low torque cutout" in which the controller 14 disables torque compensation based on low measured torque. In addition, the low torque cutout is further improved by the controller 14 gradually transitioning between torque feedback and open loop control over a range of torque as will be discussed.

Generally describing the operation of the system 10, the pilot brake device 12 comprises a pedal or equivalent thereof. During braking, the pilot of the aircraft activates the pilot brake device 12 by pushing the pedal (or its equivalent). The depression of the pedal is converted to an electrical signal 10 (brake torque command signal $T_c$) which is provided to the controller 14. The value of the command signal $T_c$ is indicative of the degree of depression of the pedal, and is related to the amount of brake torque requested by the pilot as is conventional.

As will be described more fully below in connection with FIGS. 2 and 3, the controller 14 outputs a brake torque output command $T_{output}$ to the brake actuator 16 which is based on the value of the brake torque command $T_c$. Responsive to the output command $T_{output}$, the brake actuator 16 applies pressure to the brake material in the brake assembly 18. Such pressure results in a brake torque being applied to the wheel 20 in order to slow the speed of the wheel 20. The torque sensor 22 detects the amount of torque presently exerted on the wheel 20 and provides as an output a signal $T_m$ indicative of the measured amount of torque. The signal $T_m$ is fed back to the controller 14 as shown, and is used by the controller 14 to perform torque feedback control.

Figure 2:
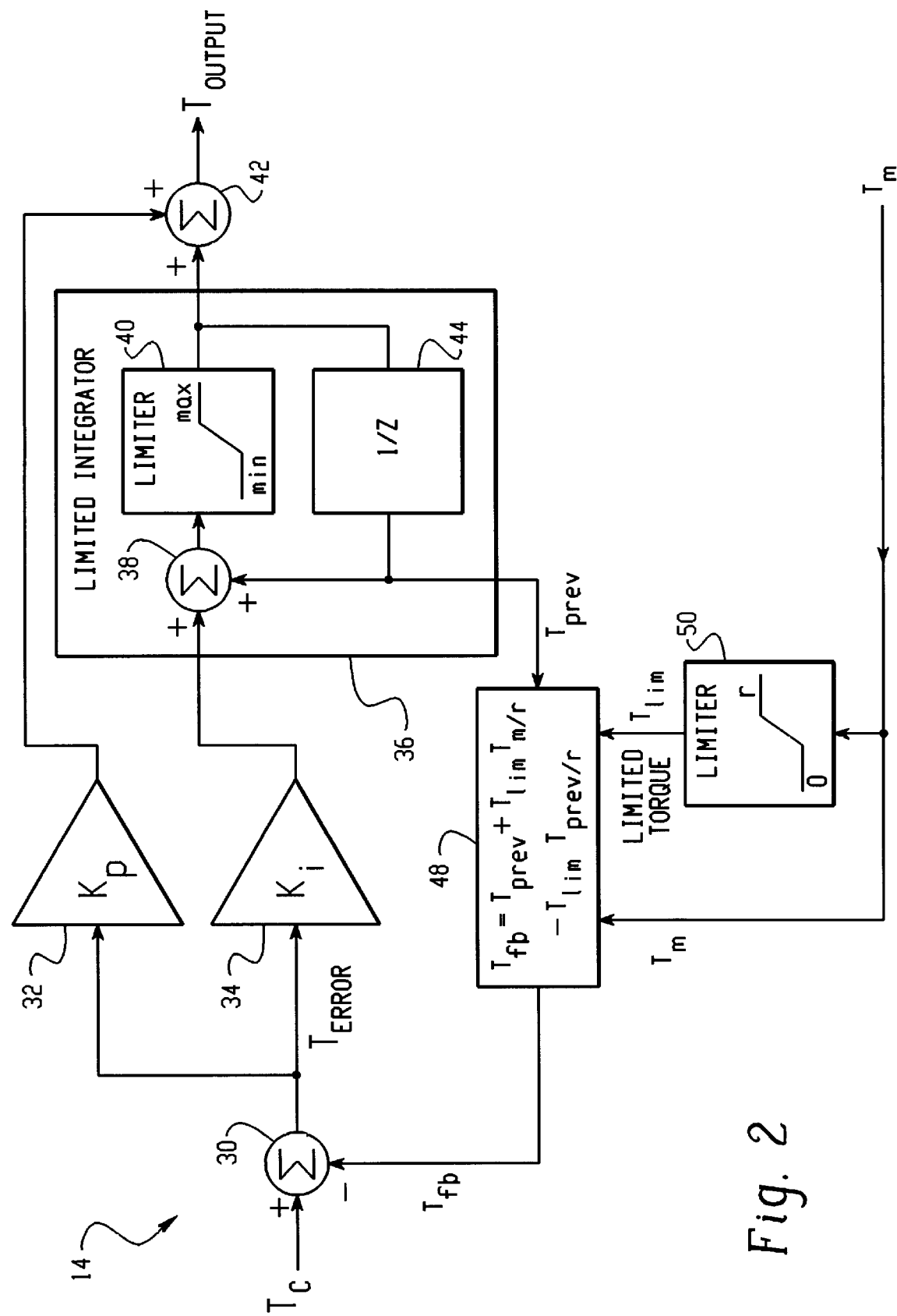
FIG. 2 is a schematic diagram of a torque level transitioning controller in accordance with the present invention for use in an embodiment having a pressure valve application based brake system.

FIG. 2 illustrates in detail a first embodiment of the torque controller 14. 3 In this embodiment, the controller 14 is used to control a hydraulic pressure valve (not shown) in the brake actuator 16. As is known, by controlling the pressure valve the amount of pressure applied by the brake actuator 16 to the brake material is controlled. Accordingly, the output $T_{output}$ of the controller 14 is provided to the pressure valve in the brake actuator 16 in order to control the braking torque.

The command signal $T_c$ representing the desired amount of brake torque is input to a summer 30. The summer 30 compares the command signal $T_c$ to a torque feedback signal $T_{fb}$ which is provided to a negative input of the summer 30. The output of the summer 30 represents a torque error signal $T_{error}$. The signal $T_{error}$ is input to a proportional gain amplifier 32 and to an integral gain amplifier 34 which are respectively included in the proportional and integral portions of a P-I controller as is known.

The proportional gain amplifier 32 preferably has a preselected gain which is less than unity, and outputs a signal which is always proportional to the torque error signal $T_{error}$. The integral gain amplifier 34 also has a preselected gain of less than one and provides as its output a scaled value of the current torque error signal $T_{error}$. The output of the integral gain amplifier 34 is coupled to a limited integrator 36 included in the integral portion of the controller 14. Specifically, the integral gain amplifier 34 provides the scaled value of the current torque error signal $T_{error}$ to a first input of a summer 38. The output of the summer 38 is input to a limiter 40 which limits the output of the summer 38 between a preselected maximum value (max) and a preselected minimum value (min) in order to limit the range of applied torque. The output of the limiter 40 is provided to a summer 42 which combines the output of the limiter 40 with the output of the proportional gain amplifier 32. The summer 42 provides as its output the brake torque output command $T_{output}$ to the brake actuator 16.

The output of the limiter 40 is also fed back through an integrator block 44 which, in the digital domain, provides as its output signal $T_{prev}$ which represents the last integrator output from the limiter 40 (e.g., from the previous sample). The output $T_{prev}$ from the integrator block 44 is then input to the summer 38 where it is added to the output of integral gain amplifier 34, thus completing the integral portion of the P-I controller.

As will be appreciated, the output signal $T_{prev}$ of the integrator block 44 represents generally the brake torque output command of the controller 14 during the last control sample (less the proportional component). The output signal $T_{prev}$ is input to a transition function block 48 which is also included in the controller 14. The transition function block 48 combines the output signal $T_{prev}$ from the integrator block 44 together with the measured torque signal $T_m$ from the torque sensor 22 and the limited measured torque $T_{lim}$, in order to determine whether the controller 14 operates with torque feedback or open loop control. Specifically, the measured torque signal $T_m$ is input to the transition function block 48. In addition, the measured torque signal $T_m$ is input to a limiter 50 which limits the value of the measured torque to a predefined range having a minimum (e.g., zero) and a maximum (r). The limited measured torque $T_{lim}$ is then output from the limiter 50 to the transition function block 48. The transition function block 48 combines the respective signals as discussed below to produce the torque feedback signal $T_{fb}$ which is output to the negative terminal of the summer 30 as mentioned above.

In order to better understand the principles behind the operation of the transition function block 48, which may be implemented using a microprocessor the like, the following technical background is considered helpful: To vary the influence of two signals on a function, the following method can be used:

$$Y(A,B)=Ax+B(1-x) \qquad \text{Equ. 1}$$

where Y(A,B) is the output, A and B are the inputs, and x is a number that varies between zero and one. The value of x controls the influence of A and B on the output.

If it is desired that A be used to control the influence of the inputs on the output, then Equ. 1 can be expressed as:

$$Y(A,B)=A^2-AB+B \qquad \text{Equ. 2}$$

where A and B are normalized to one and A equals x from Equ. 1.

This approach varies the control over the entire range of the input A. It may be more desirable to vary the influence of the signals over a narrower range. If the range is defined as zero to r, then the following method can be employed:

if A<r, then C=A
if A>r, then C=r,
and hence Equ. 2 can be rewritten as:

$$Y(A,B)=AC/r+B-BC/r=B+CA/r-CB/r \qquad \text{Equ. 3}$$

Applying Equ. 3 to the torque level transitioning controller 14 of the embodiment of FIG. 2, where:

A represents the measured torque $T_m$;
B represents the previous torque $T_{prev}$;
C represents the limited measured torque $T_{lim}$;
r represents the upper limit of the range 0 to r of the limited measured torque $T_{lim}$; and
Y(A,B) represents the torque feedback signal $T_{fb}$, the transfer function block 48 is configured to carry out Equ. 3 as follows:

$$T_{fb}=T_{prev}+T_{lim}T_m/r-T_{lim}T_{prev}/r \qquad \text{Equ. 4}$$

As will be appreciated, if the measured torque $T_m$ approaches zero so will the limited measured torque $T_{lim}$. Thus, as is noted from Equ. 4, if the measured torque $T_m$ approaches zero the torque feedback signal $T_{fb}$ will approach $T_{prev}$, or open loop control independent of the measured brake torque (i.e., no torque compensation). As the measured brake torque $T_m$ increases beyond the value of r, the torque feedback signal $T_{fb}$ becomes equal to the measured torque $T_m$ representing full closed loop control based on the measured brake torque. In between a measured brake torque $T_m$ of zero and r (the defined range), the torque feedback signal gradually transitions between open and closed loop control.

In such manner, the controller 14 provides torque compensation to substantially zero wheel speed as it is not necessary to perform low-speed cutout. Instead, the controller 14 reduces the torque compensation as the measured torque decreases. Above a predefined threshold r, the controller 14 provides closed loop control based on the measured torque to provide full torque compensation. Within the range from zero to r, the torque feedback gradually transitions between closed loop and open loop control. Thus, discontinuities in brake feel are eliminated or reduced, regardless of time or torque level. Moreover, by applying the torque level transitioning the hydraulic brake assembly 18 as driven by the actuator 16 is allowed to fill before the full feedback signal $T_{fb}$ is presented to the controller eliminating the phenomena of grabby brakes. Such fill compensation occurs at both low speed and high speed.

Figure 3:
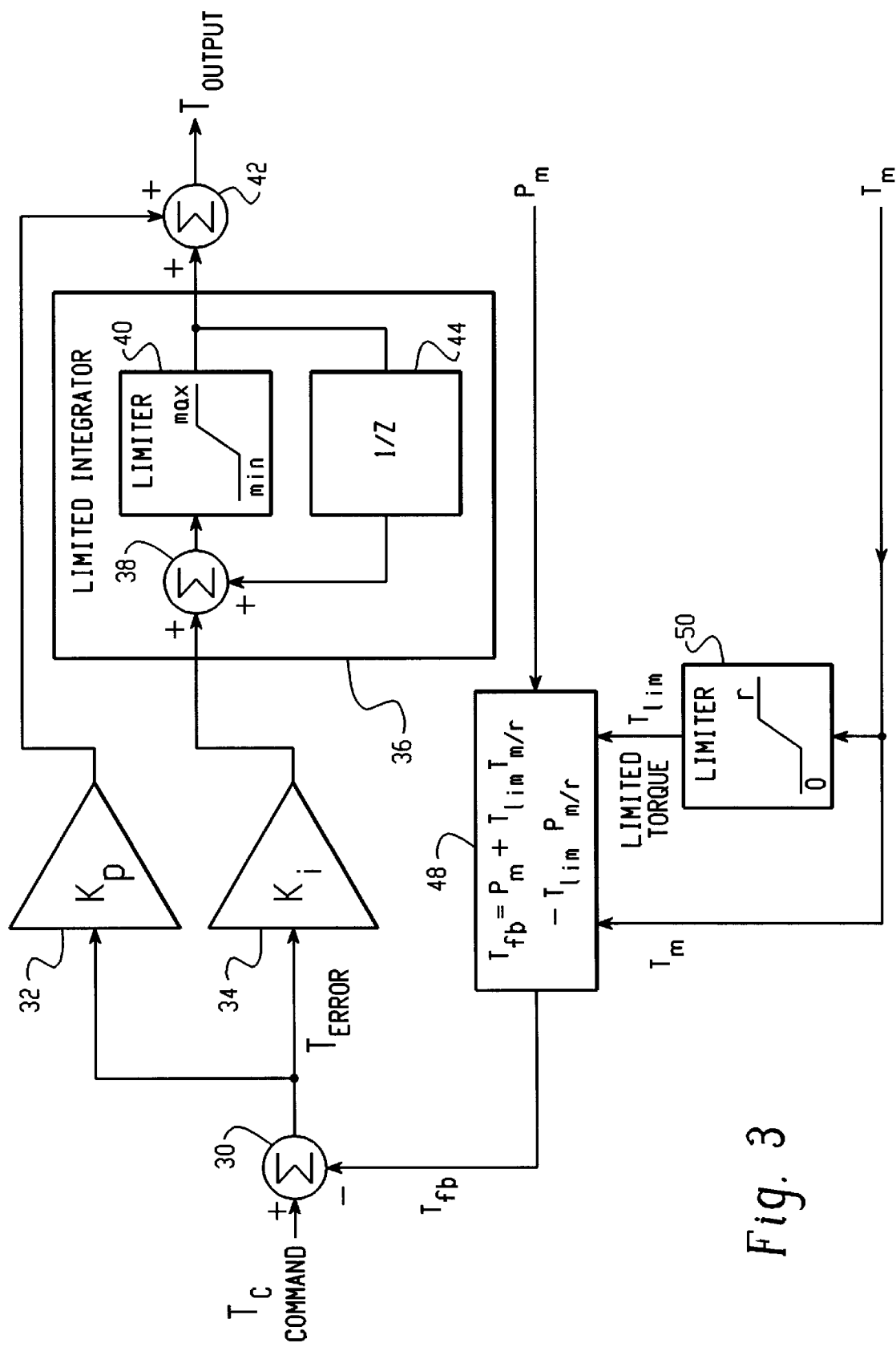
FIG. 3 is a schematic diagram of a torque level transitioning controller in accordance with the present invention for use in an embodiment having a flow valve application based brake system.

FIG. 3 illustrates another embodiment of the controller 14 for use with a brake actuator 16 which includes a flow control valve (not shown). As is known, some types of brake actuators 16 include a flow control valve which controls the flow of hydraulic fluid provided to the brake assembly 18 to produce braking torque. The embodiment of FIG. 3 is substantially the same as the embodiment of FIG. 2, and hence only the differences will be discussed herein for sake of brevity.

The embodiment of FIG. 3 includes a pressure sensor 60 (shown in phantom in FIG. 1) for measuring the hydraulic brake pressure created by the brake actuator 1 6 as a result of controlling the flow control valve using the brake torque command $T_{output}$. The output $P_m$ of the sensor 60 represents the hydraulic brake pressure provided to the brake assembly 18, and is fed back to the controller 14 (again as shown in phantom in FIG. 1). Thus, rather than using the output of the integrator block 44 as an input to the transition function block 48 representative of the previously applied torque, the measured pressure $P_m$ is utilized in lieu thereof. Preferably the gains for the pressure sensor 60 and the torque sensor 22 are set up so as to have equal full scale values.

Applying Equ. 3 to the torque level transitioning controller 14 of the embodiment of FIG. 3, where:

A represents the measured torque $T_m$;
B represents the measured pressure $P_m$;
C represents the limited measured torque $T_{lim}$;
r represents the upper limit of the range 0 to r of the limited measured torque $T_{lim}$; and
Y(A,B) represents the torque feedback signal $T_{fb}$, the transfer function block 48 is configured to carry out Equ. 3 as follows:

$$T_{fb}=P_m+T_{lim}T_m/r-T_{lim}P_m/r \qquad \text{Equ. 5}$$

Consequently, if the measured torque $T_m$ approaches zero so will the limited measured torque $T_{lim}$. Thus, as is noted from Equ. 5, if the measured torque $T_m$ approaches zero the torque feedback signal $T_{fb}$ will approach $P_m$, or open loop torque control independent of the measured brake torque. At the same time, the system effectively transitions into closed loop pressure control based on $P_m$. As the measured brake torque $T_m$ increases beyond the value of r, the torque feedback signal $T_{fb}$ becomes equal to the measured torque $T_m$ representing full closed loop torque control based on the measured brake torque. In between a measured brake torque $T_m$ of zero and r (the defined range), the torque feedback signal gradually transitions between open and closed loop control.

As a result, the embodiment of FIG. 3 provides the same advantageous features as the embodiment of FIG. 2 discussed above.

Figure 4A:
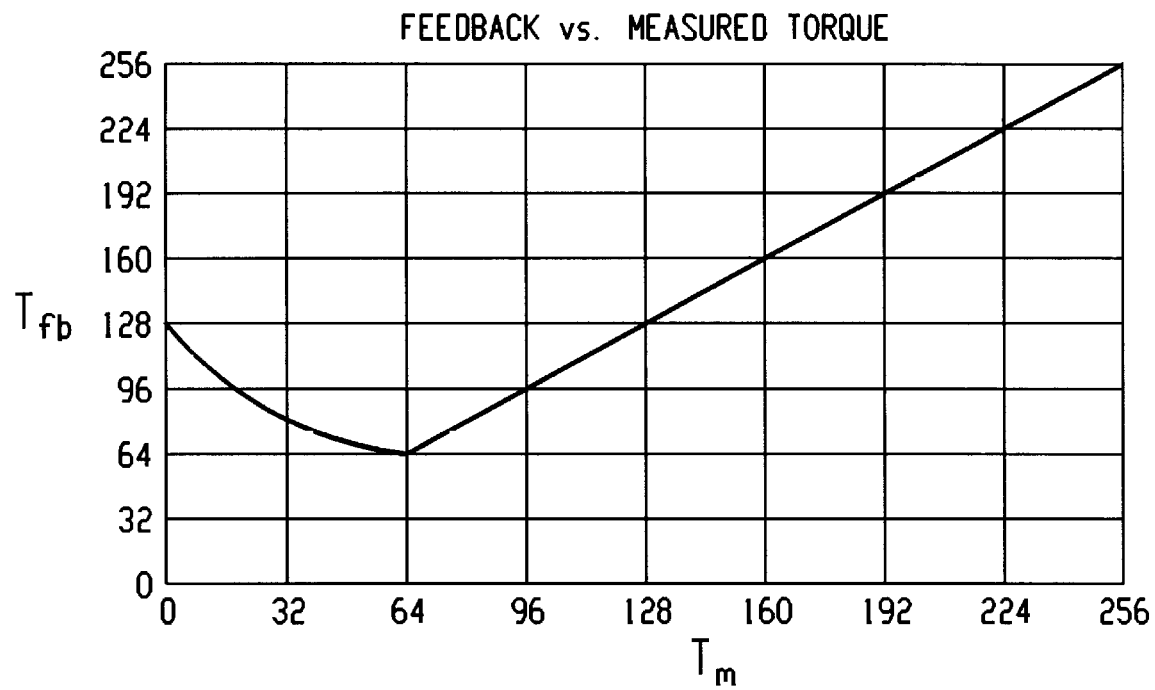
FIG. 4a is a plot showing the torque feedback versus measured torque for a constant torque command.

FIG. 4a represents a plot of torque feedback $T_{fb}$ versus measured torque $T_m$ which illustrates the effect of the controller 14 in an open loop to closed loop transition. For an eight bit controller 14, the torque command $T_c$ in the example of FIG. 4a is given to be constant at 128 units (half scale). The value of r is preselected to be 64. It is also assumed that the controller 14 is in a steady state condition, e.g., the controller output $T_{output}$ equals the requested torque command $T_c$. As is shown in FIG. 4a, the torque feedback signal $T_{fb}$ gradually transitions from the steady state condition value of 128 to 64 as the measured torque (also having a full scale value of 256 units) increases from 0 to 64 units. As the measured torque $T_m$ increases beyond 64 units, the controller 14 operates in full closed loop fashion and the torque feedback signal $T_{fb}$ increases linearly with the measured torque $T_m$. Similarly, if the measured torque $T_m$ were to decrease the feedback signal $T_{fb}$ would decrease linearly for values above r. However, as the measured torque $T_m$ decreases below r the measured torque feedback signal $T_m$ is gradually cut out until the measured torque $T_m$ reaches zero.

Figure 4B:
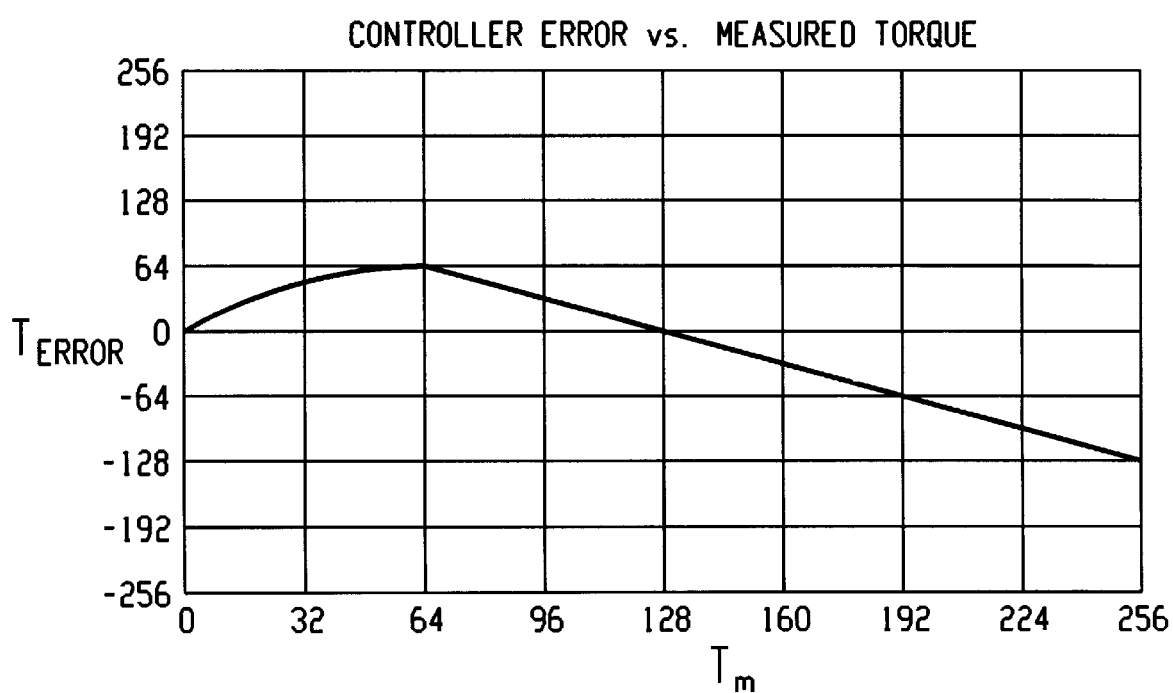

FIG. 4b represents the error signal $T_{error}$ plotted as a function of the measured torque $T_m$ under the same conditions set forth with respect to FIG. 4a. It is noted that the error signal $T_{error}$ is limited by the open loop control until the measured torque $T_m$ increases beyond 64 (the value of r).

Figure 5:
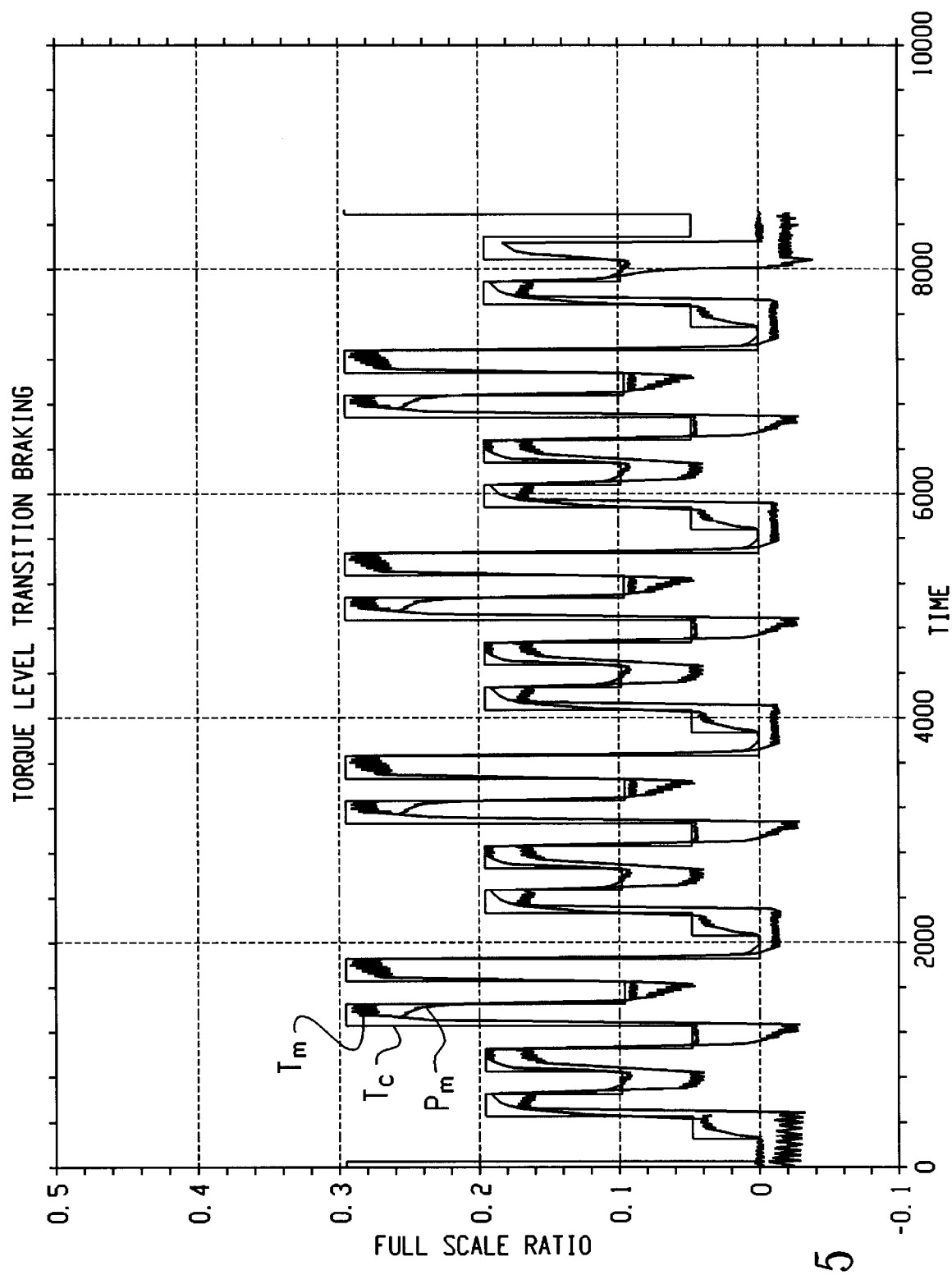
FIG. 5 is a plot showing requested torque, measured pressure, and measured torque according to one example of the present invention.
Figure 6:
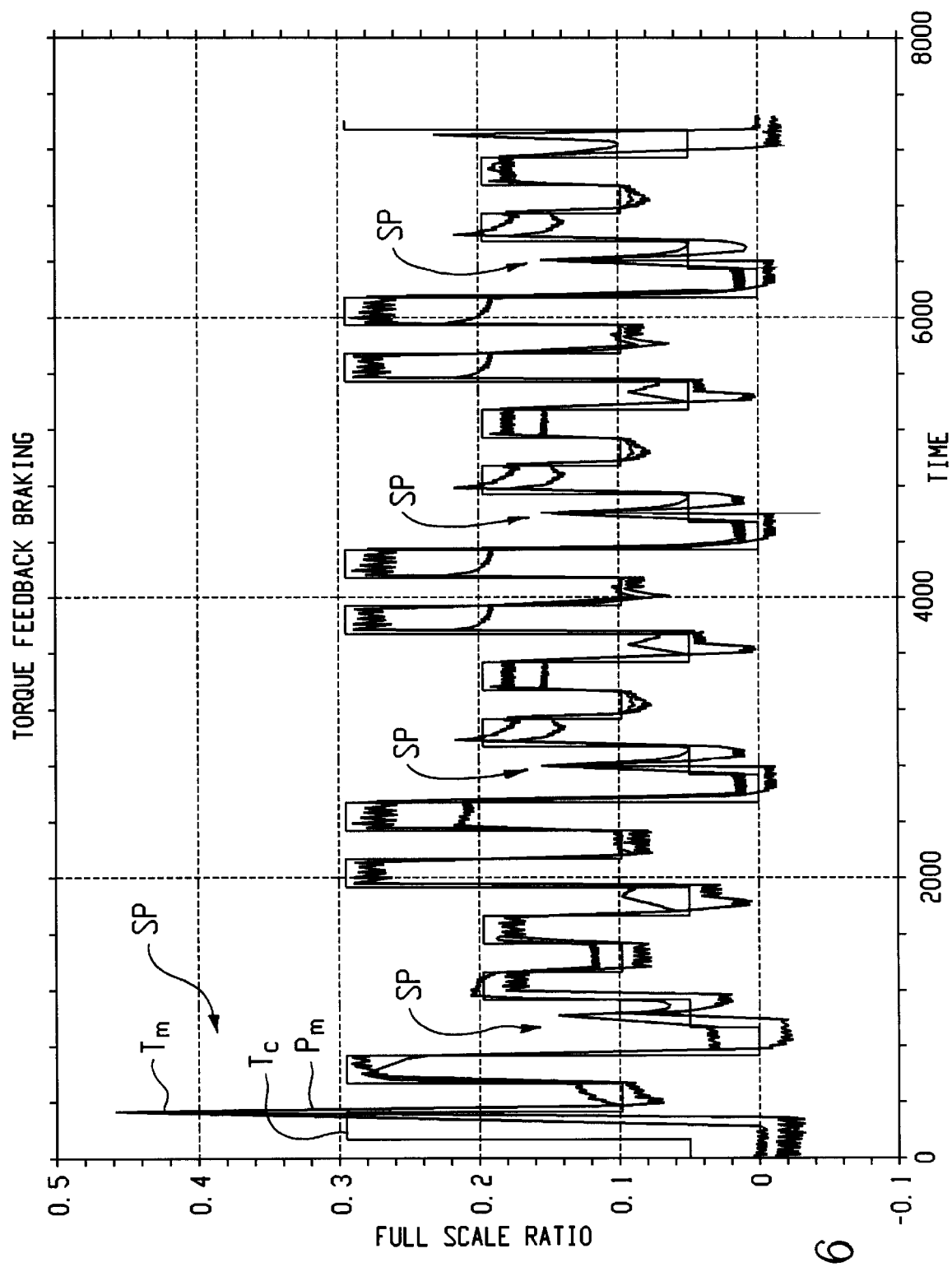
FIG. 6 is a plot showing requested torque, measured pressure, and measured torque using a conventional controller.

FIG. 5 is a plot illustrating the operation of the controller 14 in accordance with the embodiment of FIG. 3. The plot shown in FIG. 5 is to be compared with the plot shown in FIG. 6 which illustrates the corresponding operation of a controller which does not include torque level transitioning feedback in accordance with the invention. Most notably, the controller represented in FIG. 6 exhibits large torque and pressure spikes (generally labeled as SP) at the application of braking from zero. Such spikes are avoided in the present invention as illustrated in FIG. 5.

Thus, it will be appreciated that the brake system with torque feedback control using torque level transitioning provides suitable torque compensation even to zero wheel speed. Moreover, by gradually transitioning between closed loop control and open loop control over a range of torque, smooth continuous braking is achievable.

Although the invention has been shown and described with respect to certain preferred embodiments, it is obvious that equivalents and modifications will occur to others skilled in the art upon the reading and understanding of the specification. For example, Equ. 1 above assumes a linear relationship between the two signals which influence the function. Higher order relationships may be utilized without departing from the scope of the invention. In addition, in the above examples torque cutout is performed within the range of zero to r. However, in another embodiment a different range from q to r may be defined where q is non-zero. Such an embodiment may be useful in the event full torque cutout is desired to occur prior to the measured torque reaching zero.

In another embodiment, a control mechanism other than the P-I type controller described above could be used to implement the invention. For example, a PID type controller may be employed without departing from the scope of the invention. Also, the control method of the present invention may be employed using parameters other than torque, particularly for vehicles which do not have torque sensors. For example, braking may be controlled based on feedback relating to the acceleration of the vehicle. An accelerometer or other means for sensing acceleration provides a feedback signal in place of the torque sensor. The level transitioning controller determines the amount of feedback associated with the sensed acceleration using the same principles described above in place of the torque feedback signal.

The present invention includes all such equivalents and modifications, and is limited only by the scope of the following claims.

What is claimed is:

1. A system for controlling a braking torque applied to a wheel of a vehicle, comprising:

a torque level transitioning controller having an input for receiving a brake torque command indicative of a desired amount of brake torque to be applied to the wheel, and an output for providing a brake torque output command to a brake actuator and assembly which applies a brake torque to the wheel based on the brake torque output command;

a torque sensor, operatively coupled to the brake actuator and assembly and the torque level transitioning controller, for measuring an amount of brake torque applied to the wheel and feeding back a signal to the torque level transitioning controller indicative of the amount of applied brake torque; and wherein the torque level transitioning controller adjusts the brake torque output command provided to the brake actuator and assembly using torque feedback control based on the signal fed back from the torque sensor, and the torque level transitioning controller is configured to limit a degree of the torque feedback control based on the measured amount of brake torque applied to the wheel.

2. The system of claim 1, wherein the torque level transitioning controller tends toward applying open loop control without the torque feedback control based on detection of a low value of brake torque applied to the wheel.

3. The system of claim 2, wherein the torque level transitioning controller fully employs the torque feedback control based on the signal from the torque sensor as a result of the signal exceeding a predetermined threshold.

4. The system of claim 1, wherein the brake torque output command is operative to control a pressure valve included in the brake actuator and assembly.

5. The system of claim 1, wherein the brake torque output command is operative to control a flow valve included in the brake actuator and assembly.

6. The system of claim 5, further comprising a pressure sensor for measured pressure of a fluid controlled by the flow valve, the pressure being indicative of an amount of brake force applied to the wheel, and wherein the torque level transitioning controller receives the output from the pressure sensor to perform closed loop pressure control at low torque levels.

7. The system of claim 1, wherein the vehicle is an aircraft.

8. The system of claim 1, wherein the vehicle is an automobile.

9. A system for controlling a braking torque applied to a wheel of a vehicle, comprising:

a torque level transitioning controller having an input for receiving a brake torque command indicative of a desired amount of brake torque to be applied to the wheel, and an output for providing a brake torque output command to a brake actuator and assembly which applies a brake torque to the wheel based on the brake torque output command;

a torque sensor, operatively coupled to the brake actuator and assembly and the torque level transitioning controller, for measuring an amount of brake torque applied to the wheel and feeding back a signal to the torque level transitioning controller indicative of the amount of applied brake torque; and wherein the torque level transitioning controller transitions between substantially open loop control of the brake torque output command independent of the measured brake torque and substantially closed loop feedback control of the brake torque output command based on the measured brake torque as a function of the measured brake torque.

10. The system of claim 9, wherein the torque level transitioning controller transitions between substantially open loop control of the brake torque output command and substantially closed loop feedback control of the brake torque output command over a range of measured brake torque as a function of the measured brake torque.

11. The system of claim 10, wherein the function is represented by a first order equation.

12. The system of claim 10, wherein the function is represented by a second order equation or higher order equation.

13. The system of claim 9, wherein a rate at which the torque level transitioning controller transitions is controlled.

14. The system of claim 9, wherein the vehicle is an aircraft.

15. The system of claim 9, wherein the vehicle is an automobile.

16. A method for controlling a braking torque applied to a wheel of a vehicle, comprising the steps of:

receiving a brake torque command indicative of a desired amount of brake torque to be applied to the wheel, and providing a brake torque output command to a brake actuator and assembly which applies a brake torque to the wheel based on the brake torque output command;

measuring an amount of brake torque applied to the wheel and using a signal indicative of the amount of applied brake torque to perform torque feedback control of the brake torque output command; and adjusting the brake torque output command provided to the brake actuator using the torque feedback control based on the measured amount of brake torque, the adjusting step including a step of limiting a degree of the torque feedback control based on the amount of brake torque applied to the wheel.

17. The method of claim 16, wherein the step of limiting includes transitioning toward applying open loop control without the torque feedback control based on detection of a low value of brake torque applied to the wheel.

18. The method of claim 17, wherein the step of limiting includes fully employing the torque feedback control based on the signal from the torque sensor as a result of the signal exceeding a predetermined threshold.

19. A method for controlling a braking torque applied to a wheel of a vehicle, comprising the steps of:

receiving a brake torque command indicative of a desired amount of brake torque to be applied to the wheel, and providing a brake torque output command to a brake actuator and assembly which applies a brake torque to the wheel based on the brake torque output command;

measuring an amount of brake torque applied to the wheel and using a signal indicative of the amount of applied brake torque to perform torque feedback control of the brake torque output command; and transitioning between substantially open loop control of the brake torque output command independent of the measured brake torque and substantially closed loop feedback control of the brake torque output command based on the measured brake torque as a function of the measured brake torque.

20. The method of claim 19, wherein the transitioning step includes transitioning between substantially open loop control of the brake torque output command and substantially closed loop feedback control of the brake torque output command over a range of measured brake torque as a function of the measured brake torque.

21. A torque level transitioning controller for controlling a braking torque applied to a wheel of a vehicle via a brake actuator and assembly based on an output of a torque sensor which measures an amount of brake torque applied to the wheel, the output of the torque sensor being fed back to the torque level transitioning controller, the torque level transitioning controller comprising:

an input for receiving a brake torque command indicative of a desired amount of brake torque to be applied to the wheel, and an output for providing a brake torque output command to the brake actuator and assembly which applies a brake torque to the wheel based on the brake torque output command;

another input for receiving the output of the torque sensor; and circuitry for adjusting the brake torque output command provided to the brake actuator and assembly using torque feedback control based on the output received from the torque sensor, so as to limit a degree of the torque feedback control based on the measured amount of brake torque applied to the wheel.

22. The controller of claim 21, wherein the torque level transitioning controller tends toward applying open loop control without the torque feedback control based on detection of a low value of brake torque applied to the wheel.

23. The controller of claim 22, wherein the torque level transitioning controller fully employs the torque feedback control based on the signal from the torque sensor as a result of the signal exceeding a predetermined threshold.

24. A torque level transitioning controller for controlling a braking torque applied to a wheel of a vehicle via a brake actuator and assembly based on an output of a torque sensor which measures an amount of brake torque applied to the wheel, the output of the torque sensor being fed back to the torque level transitioning controller, the torque level transitioning controller comprising:

an input for receiving a brake torque command indicative of a desired amount of brake torque to be applied to the wheel, and an output for providing a brake torque output command to the brake actuator and assembly which applies a brake torque to the wheel based on the brake torque output command;

another input for receiving the output of the torque sensor; and circuitry which transitions between substantially open loop control of the brake torque output command independent of the measured brake torque and substantially closed loop feedback control of the brake torque output command based on the measured brake torque as a function of the measured brake torque.

25. The controller of claim 24, wherein the torque level transitioning controller transitions between substantially open loop control of the brake torque output command and substantially closed loop feedback control of the brake torque output command over a range of measured brake torque as a function of the measured brake torque.

26. The controller of claim 25, wherein the function is represented by a first order equation.

27. The controller of claim 25, wherein the function is represented by a second order equation or higher order equation.

28. The controller of claim 24, wherein a rate at which the torque level transitioning controller transitions is controlled.

29. A method for controlling a braking torque applied to a wheel of a vehicle, comprising the steps of:

receiving a brake torque command indicative of a desired amount of brake torque to be applied to the wheel, and providing a brake torque output command to a brake actuator and assembly which applies a brake torque to the wheel based on the brake torque output command;

measuring a parameter which varies as a result of the amount of brake torque applied to the wheel and using a signal indicative of the measured parameter to perform feedback control of the brake torque output command; and adjusting the brake torque output command provided to the brake actuator using feedback control based on the measured parameter, the adjusting step including a step of limiting a degree of the feedback control based on a value of the measured parameter.

* * * * *